March 18, 1969     G. E. MERCER     3,433,534
AUTOMATIC BALANCER

Filed Feb. 10, 1967     Sheet 1 of 4

INVENTOR
GORDON E. MERCER

BY

ATTORNEYS

March 18, 1969 G. E. MERCER 3,433,534
AUTOMATIC BALANCER

Filed Feb. 10, 1967 Sheet 3 of 4

INVENTOR
GORDON E. MERCER

BY

ATTORNEYS

United States Patent Office 3,433,534
Patented Mar. 18, 1969

3,433,534
AUTOMATIC BALANCER
Gordon E. Mercer, 148 E. Mercury Blvd.,
Hampton, Va. 23369
Filed Feb. 10, 1967, Ser. No. 616,429
U.S. Cl. 301—5      2 Claims
Int. Cl. B60b 13/00, 1/00, 27/00

ABSTRACT OF THE DISCLOSURE

An apparatus and method for dynamically balancing rotating masses such as space vehicle components, space stations, automobile wheels, shafting, etc. The rotating mass having retainer means which surrounds the mass and houses spherical weight means movable in the retainer means. The retainer means being designed such that the weight means is positioned on opposite sides of the geometrical center of the rotatable mass. Mechanism associated with the retainer and weights for fixing them in a balancing position at all rotational speeds of the rotatable mass. Structure for releasing the spherical weights to provide for rebalancing when necessary.

---

The invention described herein was made by an employee of the United States Government and may be manufactured and used by or for the Government for governmental purposes without the payment of any royalties thereon or therefor.

This invention relates to an automatic dynamic balancing technique for rotating masses such as automobile wheels, airplane wheels, rotating antennas, space stations, space vehicle payloads, missile warheads, shafting, spinning appliances, and helicopter blades as examples.

Many types of balances are presently known and utilized; however, do not provide the optimum dynamic balance for various reasons. Many of the prior art balancers utilize the idea of fixing the retainer of some kind or other to the rotatable mass and placing spherical or other types of weights in the retainer allowing the weights to move freely to the light side of the rotating mass to accomplish balancing. Although this type of mechanism provides a form of balancing, particularly when the masses are rotating above their critical speed, it is actually a detriment when the masses rotate below critical speeds. Such a balancer does more harm than good, for example, on an automobile wheel of a vehicle which is driven primarily around town and therefore below the critical speed of the wheel. Fluids have also been utilized with the spherical or other type weights to facilitate their positioning; however, the combination does nothing to correct the above-identified problem.

The idea of placing a fusible material in a retainer which is fixed to a rotatable mass has also been suggested in the prior art. With this arrangement the fusible material is rendered molten when the mass is rotating above critical speed and flows to the light side of the rotating mass to provide balancing. When the fusible material is in this position it is allowed to solidify to provide balancing. Although this type of balancing has some merit at speeds both below and above critical, since once the fusible material solidifies it remains in a given position at all speeds, it has been found through experimentation that this technique does not provide optimum balancing.

Many prior art balancers also utilize some type of mechanical device for fixing a weight movable in a retainer that may change position when the rotatable mass approaches or goes below critical speed. This type of mechanism provides for a type of balancer operative at all speeds of rotation; however, it has been found that this is not enough to provide the optimum dynamic balance. It is not only necessary to position a weight in a retainer at the proper point, and hold it at this point, but to obtain dynamic balance it is also necessary that the retainer or retainers be positioned or designed such that the weights can be distributed in planes on opposite sides of the geometric center or center of gravity of the rotatable mass. Generally, prior art devices fail to take his factor into consideration.

The present invention overcomes the above-mentioned difficulties by providing a retainer which is designed so that weights placed therein can be retained in a position on either or both sides of the geometric center or center of gravity of the rotating mass, or a multiplicity of retainers which are equally distributed on either side of the geometric center of the rotatable mass to provide for optimum dynamic balancing. In addition, techniques are utilized wherein the spherical weight movable in the retainer can be fixed and maintained in position at all speeds of rotation to accomplish a near perfect dynamic balance, heretofore unobtainable.

It is therefore an object of this invention to provide a dynamic balancer which provides optimum dynamic balancing at all rotational speeds of a mass with which it is associated.

Still another object of this invention is to provide a dynamic balancer including mechanism for rebalancing should the rotating mass lose its proper balance.

Yet another object of the invention is to provide a dynamic balancer for vehicle wheels or the like, wherein balancing can be accomplished during normal operation of the vehicle.

A further object of the invention is to provide a method of balancing wherein the precise position for adding weights to a rotatable mass can be precisely determined.

An additional object of the invention is to provide a dynamic balancer which is simple in design, easy to manufacture and maintain, and operable by one having little or no skill in the balancing art.

Another object of the invention is to provide a dynamic balancer which has application to any type of rotating mass regardless of its kind or shape provided it is susceptible to being balanced.

These and other objects and advantages of the invention will become more apparent upon reading the specification in conjunction with the accompanying drawings.

Figure 1:
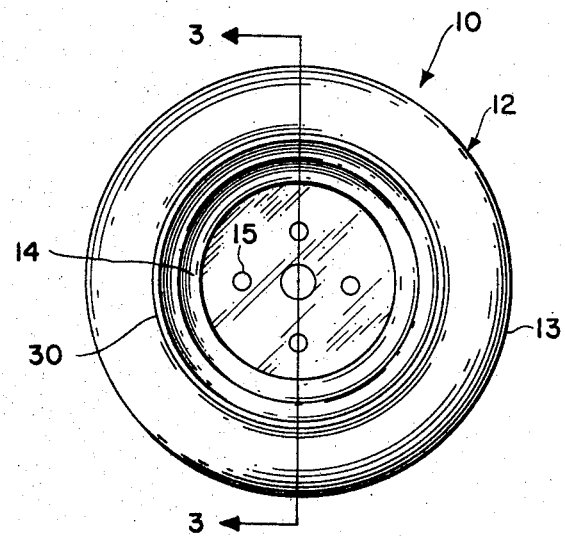
FIG. 1 is a side elevational view of a rotatable mass equipped with the dynamic balancer of this invention.

Referring now more specifically to the details of the invention, FIG. 1 shows a rotating mass designated generally by the reference numeral 10, and for purposes of illustration, can be considered the wheel of a vehicle.

The wheel assembly, generally 12, has a tire 13 which is mounted on rim 14 both of conventional design. Lugs 15 connect the wheel assembly 12 to a hub 20 (FIG. 3) which is associated with an axle 21 also of conventional design.

The axle 21 is hollow having a passage 22 for purposes which will be explained more fully hereinafter. The hub and axle are journaled within a housing 23 having a hub cover or drum 24 in the usual manner. The axle 21 and housing 23 connected, respectively, to the universal mechanism and its housing or to other similar drive train mechanism.

Figure 2:
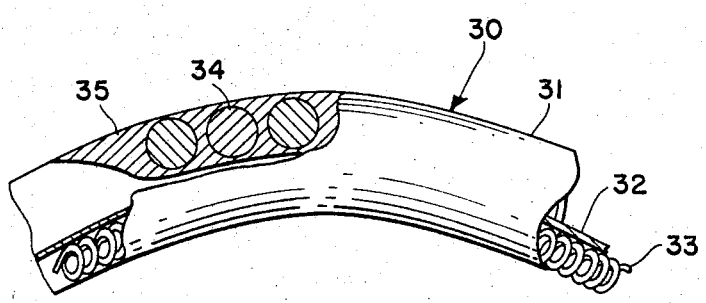
FIG. 2 is a side elevational view, partially cut away, of a segment of the dynamic balancing structure.
Figure 3:
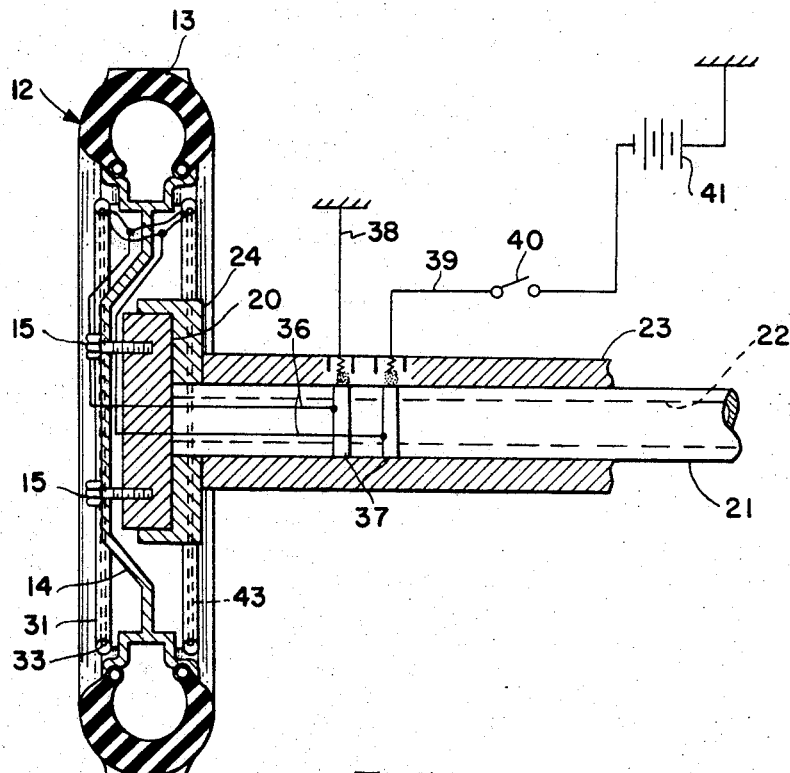
FIG. 3 is a cross sectional view taken along the section lines 3—3 of FIG. 1.

The balancing mechanism is designated generally by reference numeral 30 and is illustrated in FIGS. 1–3. As shown in FIG. 3, the balancing mechanism 30 includes a pair of tubes or retainers 31 and 43 connected, respectively, to the outside and inside of rotatable mass or wheel 12. Since the structure of the retainers 31 and 43 are substantially identical, only the retainer 31 will be explained in detail. The retainer 31 shown in FIGS. 2 and 3 is of a tubular design formed into a ring-like member, being joined to form a continuous passage through the retainer. The tube or retainer may be divided into compartments by a divider strip 32, best shown in FIG. 2. Under certain circumstances it may not be desirable to use the divider strip depending on the mass of the spherical weights and fusible material to be explained more fully hereinafter. A heating element 33 is carried in the lower compartment as viewed in FIG. 2 or as close to the innermost surface of the retainer as the heating element 43 will allow. As shown in FIG. 2, the heating element 33 occupies the compartment formed by the divider 32 and the innermost surface of the retainer.

Placed in the other compartment are spherical weights 34 which vary in number depending on the estimated unbalance of the rotatable mass to be balanced. Also occupying this compartment is fusible metal 35. A sufficient quantity of the fusible material 35 is placed into the compartments such that when it is in its liquid state it will engulf at least a portion of the spherical weights. Upon solidification the spherical weights will be held in a particular position for purposes that will be explained more fully hereinafter. The spherical weights may take the form of steel balls or similar objects, and the fusible metal may be of the nature of Cer-o-bend or similar material having a relatively low melting point. Lightweight balls or hollow balls made of aluminum or other material could be used in the channel; however, the channel would be filled or nearly filled with a more dense material. If the balls are lighter than the fluid they move to the heavy side and the amount of balancing is the difference between the weight of the balls and the displaced fluid.

Electrical wiring 36 is connected to the heating elements 33 (FIG. 3) and lead to slip rings 37 which are associated with the axle 23. The slip rings 37 are of conventional design providing a mechanism for transferring electrical power from a stationary object to a rotating object.

A ground line 38 leads from one of the slip rings to ground, which in a vehicle may be the vehicle body or frame. A power line 39 leads from the other slip ring to a switch 40 which may be a single throw switch for making and breaking a circuit. The switch 40 would be located on the dashboard or positioned in a similarly convenient place in the vehicle. The other end of switch 40 is tied to a power supply 41, being a battery or similar power source. The battery is grounded to complete a circular similar to the usual electrical system in a vehicle.

Although not shown, it is to be understood that the mechanism for heating the fusible material within the retainers may take other forms. For example, the retainers themselves might be constructed of a heat-conductible material carried by an insulating type bracket which would electrically insulate the retainers from the rim. Obviously, this would eliminate the necessity of heating elements as shown in FIG. 2, and in certain situations be a preferable arrangement.

Figure 4:
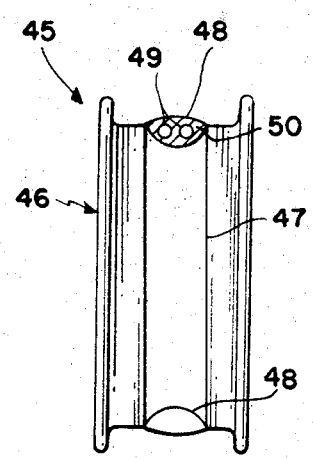
FIG. 4 is an end elevational view of a rotatable mass showing an alternate embodiment of the invention.

An alternate embodiment of the invention is shown in FIG. 4 wherein a wheel designated generally by the reference numeral 45 is the rotatable mass. The wheel 45 has a rim 46, with a rim channel 47, designed in the usual manner. As is apparent from FIG. 4, the rim channel 47 has a substantial width dimension extending a considerable distance on either side of the geometric center or center of gravity of the wheel. A channel cover 48 is fixed to the rim and completely surrounds the rim so as to form an enclosure about the circumference of the rim channel. Spherical weights 49 are located within the enclosure as is fusible metal 50. A heating element (not shown) similar to the heating element in FIG. 2 or other comparable structure (not shown) may be utilized with the wheel 50 to melt the fusible material allowing the spherical weights to move to a balancing position and be retained in position upon solidification of the material. FIG. 4 is believed to clearly illustrate that the spherical weights may assume a position on either side of the geometrical center of the wheel providing an arrangement wherein a dynamic balancer can be obtained. Under certain circumstances it might be desirable to provide a divider to keep the spherical weights on either side of the geometric center of the rim channel.

Figure 5:
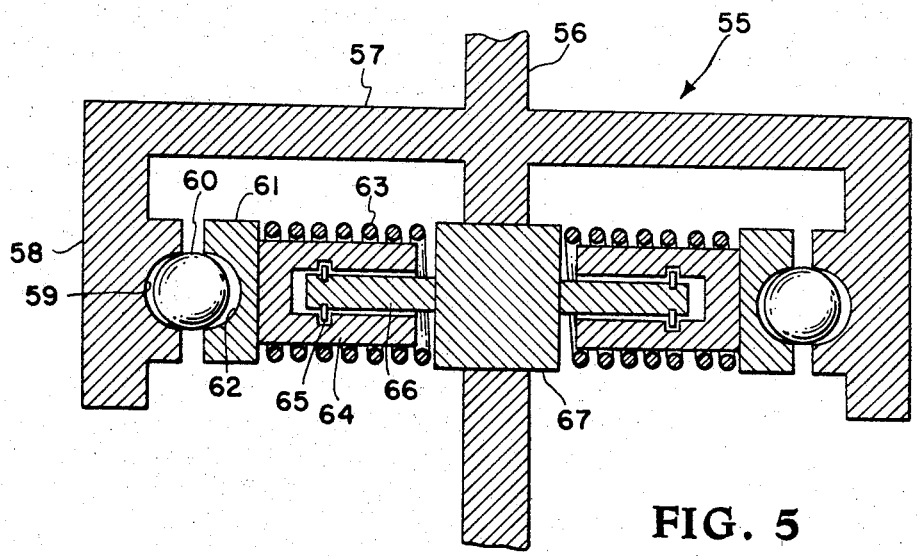
FIG. 5 is a segmental, cross sectional view of a rotatable mass showing an alternate embodiment of the invention using retainers located on either side of geometric center of the rotatable mass and means for releasing and clamping weights movable in the retainers.

Still another embodiment of the invention is shown in FIG. 5 and is designated generally by the reference numeral 55. The central support structure 56 may constitute a portion of a wheel rim or some other rotatable mass which is to be balanced.

Branching from either side of the support structure 56 is similar branching structure cooperating to make up the overall balancer. However, since these structures are essentially identical, only the structure on one side of the support will be described in detail.

The members branching from the support 56 are termed legs, the leg being designated generally by reference numeral 57. A foot portion 58 extends downwardly in a direction normal to the leg 57. Formed on the inside face of foot 58 is a race 59. Spherical weights 60 are partially carried on the race 59 and are free to move with respect thereto under certain circumstances to be explained more fully hereinafter. The shape of the race 59 is slightly less than spherical, and the dimension slightly less than the diameter of the spherical weights 60 to provide a clamping edge. A clamping ring 61 having a race 62 is located opposite the race 59 to form a partial enclosure which together with the race 59 retains the spherical weights in a position with respect to the rotatable mass. The clamping ring 61 is fixed to a sleeve 64 which operates as a supporting member. A lost motion connection 65, in the form of a slot and pin, connects the sleeve 64 to an actuator rod or pin 66. The actuator 66 forms a part of a solenoid 67 which is carried by the support 56. A spring 63 surrounds the sleeve 64 and engages at one end the clamp ring 61 and at the other end, the housing of the solenoid 67. The spring 63 is of the compression type and urges the clamping ring 61 toward the foot 58 normally clamping the spherical weights 60 between the races 59 and 62. It is believed apparent that actuation of the solenoid 67 will cause the sleeve 64, and thus the clamping ring 61, to be drawn back toward the support 56 freeing the spherical weight 60 for movement to a balancing position. Upon deenergization of the solenoid the spring again causes the balls to be clamped in position. It is believed to be apparent from FIG. 5 that operation of solenoid 67 will simultaneously release the spherical weights located on both sides of rotatable mass allowing them to seek a balancing position. Also, it should be recognized that for a rotatable mass, such as a wheel, it would be necessary to position solenoids, sleeves, springs, etc., at spaced intervals about the mass or tie them together in some manner to provide uniform movement of the clamping ring and thus proper operation of the device.

Figure 6:
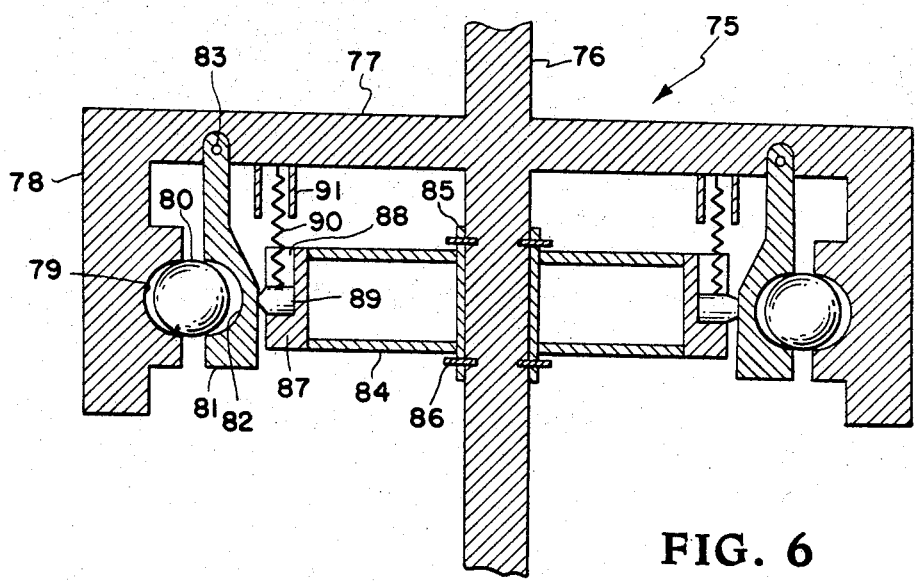
FIG. 6 is a segmental, cross sectional view of a rotatable mass utilizing retainers placed on either side of the geometric center of the rotating mass and release means operative under centrifugal force to release weights movable in the retainers.

Still another embodiment of the invention is shown in FIG. 6, the rotatable mass in this embodiment being designated generally by the reference numeral 75. The balancing concept suggested in the FIG. 6 embodiment is quite similar to that shown in the FIG. 5 embodiment, but differs in that a different mechanism is utilized to release and clamp the spherical weights. Also, as in the FIG. 5 embodiment, the FIG. 6 embodiment has similar structure on opposite sides of the rotatable mass. In view of the similarity of the structures appearing on both sides of the mass, only one side will be explained in detail.

The rotating mass 75 has a centralized support 76 from which branches 77 project generally in a perpendicular direction. The branches 77 have the foot 78 directed downwardly in a generally normal direction. Formed on the inside face of the foot 78 is a race 79 of generally the same design as the races 59 and 62 in the FIG. 5 embodiment. Spherical weights 80 are carried on the race 79 and the race 72 formed in a clamping ring 81 located directly opposite foot 78. The clamping ring 81 has an arm formed integral therewith which projects upwardly therefrom and has a pivotal connection 83 with the support 77.

A brace 84 having a base plate 85 is secured to the support 76 by threaded fasteners 86 or the like. A block 87 is fixed to the end of the brace 84 in a conventional manner such as by welding or threaded fasteners and is positioned so as to oppose a surface of the clamp ring 81. A guide slot 88 is formed in the guide block 87 and receives a wedge 89. The wedge 89 is movable in the guide slot 88, but is normally urged into the solid line position shown in FIG. 6 by a spring 90 which is located between the wedge and the support 77. A spring shield 90 surrounds the spring 90 and helps to maintain it in the proper position of engagement with the wedge 89.

It is to be understood that the device shown in FIG. 6 is merely a cross section of a rotatable mass, the race structure shown forming a continuous surface about the circumference of the rotating mass the clamping ring portion of the race being segmented for proper operation. The springs and wedge structure appear at spaced intervals at a frequency required by good design and engineering practice. As shown in FIG. 6, the rotatable mass 75 would rotate into and out of the paper in operation. The weight 89 is designed so that it will move under centrifugal force when the rotatable mass has reached a rotation speed above its critical period. When this occurs, the clamping ring 81 is free to swing away from the foot 78 due to the beveled surface on the clamping ring 81. This will free spherical weights 80 allowing them to assume the proper balancing position. As the rotatable mass slows down, the spring 91 will overcome the centrifugal force and force the wedge downward causing the clamping ring 81 to engage these spherical weights in a clamping position. As in the previous embodiment, it should be understood that this operation takes place simultaneously on both sides of the support 76 providing for an optimum dynamic balance. It is believed apparent that the clamping ring 81 will release automatically each time the mass rotates at a speed to move the weight 89 to a releasing position. Under certain circumstances this may not be desirable. It is considered within the scope of the invention to insert a pin through the foot 78 into the clamping ring 81 locking the elements together. This could be accomplished with a threaded fastener. Thus the fastener could be backed off when balancing is desired and engaged when balancing has been completed.

Figure 7:
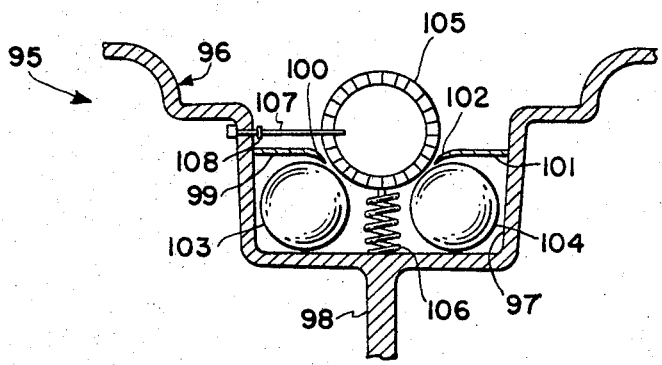
FIG. 7 is a segmental cross sectional view of a vehicle wheel showing another invention balancing mechanism operable under the influence of centrifugal force.

Another technique for dynamically balancing is shown in FIG. 7, the rotating mass in this embodiment being designated generally by the reference numeral 95. Again, for purposes of illustration, the mass is considered to be a vehicle wheel or rim 96. The rim 96 is of conventional design having a well portion 97, generally U-shaped as illustrated in FIG. 7. A wheel lug or body flange 98 extends from the base of the well 97 in a conventional manner. Fixed to opposite sides of the well 97 are stops 99 and 101, respectively. These stops have downwardly turned lips 100 and 102, respectively. The stops together with the wheel well form passageways or retainers for spherical weights 103 and 104.

A segmented channel clamp 105, having a generally circular shape in cross section, nests between the stops and engages the spherical weights 103 and 104. A series of springs 106 are connected to the channel clamp segments and to the base of the rim well 97. These springs are under tension and normally draw the channel clamp 105 into engagement with the spherical weights 103 and 104 clamping them in a fixed position with respect to the wheel. Depending on the weight of the clamping channel and the strength of the spring, the channel clamp will move outwardly under the influence of centrifugal force releasing the spherical weights so that they can assume a balancing position.

A latch pin 107 (or series of pins) is designed to engage the clamping channel to render it inoperative in order that the channel clamp does not release every time the mass is rotated at or above the release speed. A keyway is formed through the rim well 97 which allows passage of a transverse peg 108 when the latch pin is rotated to the proper position. A spring may also be placed between the head of the latch pin and the rim well to prevent rotation of the latch pin and accidental release of the channel clamp. Obviously, when the latch pin is rotated to the proper position and the peg 108 drawn through the keyway and again rotated outside the rim well, the latch pin will be held in the disengaged position. The balancer is then free to operate automatically.

An application of the balancing technique of this invention is shown applied to the payload of a space launch vehicle. It has been found that where the polar moment of inertia of a rotating body is greater than the transverse moment of inertia the invention balancer will provide dynamic balancing. Since this situation exists in most payloads and space stations, dynamic balancing can be accomplished.

Figure 8:
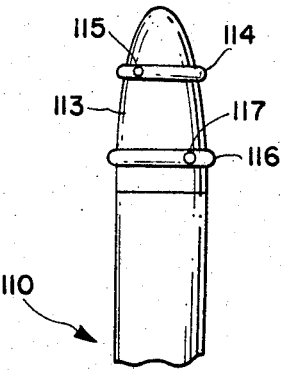
FIG. 8 is a side elevational view of a space vehicle showing the application of the invention to a space vehicle payload.

The arrangement shown in FIG. 8 includes a launch vehicle 110 having a body 111 and stabilizers 112. Mounted on top the vehicle is a payload 113. Retainers 114 and 116 are secured to the payload above and below the geometrical center or center of gravity of the payload. The retainers contain spherical weights 15 and 17 and fusible material (not shown) similar to that shown in the FIG. 1 embodiment. Also, mechanism for heating the fusible material (not shown) is associated with the retainer.

At the initiation of spin stabilization of payload, the fusible material can be melted allowing the spherical weights to assume the proper position. Normally rotation of a free-free body, such as a payload or space station in the space environment, at any speed is above its critical speed. Thereafter, the fusible metal can be allowed to solidify providing a dynamic balance. Commands can be provided by remote control within the realm of existing technology, or by onboard instrumentation also known in the art. Obviously, the technique shown in other embodiments of the invention can be used for balancing space-oriented devices.

Figure 9:
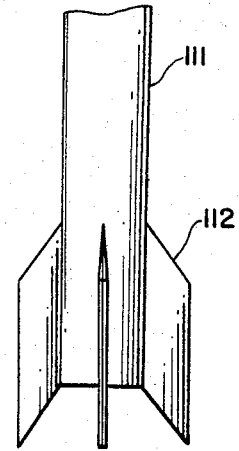
FIG. 9 is an elevational view of an apparatus for utilizing the method for the invention to determine proper positioning of weights on a rotatable mass.

FIG. 9 shows mechanism whereby the method of the invention can be applied to a rotatable mass. The apparatus is designated generally by the reference numeral 120. The apparatus is mounted on table 122 which has a raised platform 123. A motor or other type prime mover 124 is secured to the platform 123 and drives a shaft through a flexible coupling 125. The shaft is supported in bearings 126 and 128 which are in turn carried by a vibration damper type support 127 and 129, respectively, in the form of coil springs.

The rotatable mass 130 is provided with retainers 132 and 137, positioned on either side of geometric center of the rotatable mass. The retainers contain spherical weights and fusible material or other mechanism of the invention for fixing the weights with respect to the mass.

The rotatable mass 130 is mounted on the shaft 125 which is utilized to rotate the mass above its critical speed. Electrical power can be supplied to the retainers which may have heating elements or be otherwise heated to melt the fusible material. The rotatable mass is rotated at a speed above critical by the motor 124, and the spherical weights allowed to seek a balancing position at which point the fusible material is solidified. The rotatable mass 130 is then removed from the shaft 125 and the spots marked on the rotating mass where the spherical weights are to be positioned. The retainers 132 and 137 are then removed from the rotatable mass and weights applied to the spots marked on the mass. The amount of weight necessary to be added is identical to the weight of the spherical weights the value of which has previously been determined, or the minimum amount of weight necessary and exact location can be calibrated.

Retainers 132 and 137 may be fixed to a rotating mass by means of an adhesive which is readily dissolvable in a solution after balancing, or may be attached to a rotating mass with some type of mechanical clamping mechanism, various types of which are known in prior art. Also, the retainers may be located on the shaft adjacent to or abutting the mass to be balanced.

*Operation*

From the above description, the operation of the dynamic balancer invention is believed to be apparent; however, for a better understanding the operation of the various embodiments will be discussed in greater detail.

The device shown in FIG. 3 utilizes the spherical weights 34 to obtain balancing, and the fusible metal 35 to maintain the weights in the proper balancing position. Assuming that this balancer is associated with a vehicle, and it is desirable to balance a wheel on the vehicle, the vehicle would be driven, preferably, to a relatively straight and smooth stretch of highway. The vehicle would be accelerated to a speed such that the wheel was rotating above its critical speed. For most vehicles this would be a speed range of from 40 to 55 m.p.h. While traveling at this speed, the switch 40 would be closed completing a circuit to the heater element 33. The heater element 33 will cause the fusible material 35 to assume a liquid state and allow the spherical weights 34 to seek a balancing position. The time required for the fusible metal to melt and the spherical weights to seek a balancing position can be determined by experimentation. Also, it is apparent that a heat sensing device could be connected to the heater element and displayed in the area of the switch of the vehicle to indicate to the operator when the fusible material has melted and balancing has been accomplished. Upon opening the switch 40, the fusible metal solidifies retaining the weights in the precise position of balance. Generally, the spherical weights should be of a sufficient size and weight so that balancing of the wheel is accomplished by the weights, the weight of the fusible material having a negligible effect on the balance.

It should also be recognized that other techniques for melting the fusible material might be utilized, for example, the heating element 33 might be connected with an ordinary 110-volt receptacle. An extension cord could be utilized to supply power to the heating element while the vehicle is in a stationary position in the vehicle owner's driveway or at a gas station or a garage. When the fusible metal is melted, the extension cord connection could be removed, and the operator then drive the vehicle at a speed above critical, the fusible metal clamping the weights in the proper position as the material cools. Normally, the fusible material would remain in a liquid state long enough to accomplish balancing prior to its solidification.

Obviously, the arrangement shown in FIGS. 1–3 can be connected to all the wheels of the vehicle such that upon energization of the switch 40, balancing would take place with all four wheels simultaneously. Also, it should be apparent that each wheel might have an individual circuit enabling each to be balanced separately.

Balancing a wheel carrying the apparatus shown in FIG. 4 of the invention would be accomplished in a manner identical to that expressed above. In the FIG. 4 embodiment, the width of the channel 47 allows the weights to assume a position on either side of the geometric center of the rim. Thus, the concept of optimum dynamic balance is obtainable with this arrangement in a manner similar to utilizing a retainer on the inside and outside of the wheel as in the apparatus of FIGS. 1–3. As previously explained, the wheel 45 may be provided with a heating element to melt the fusible metal and be associated with electrical equipment such as shown in FIG. 2 so that balancing can be accomplished while the vehicle is moving.

The device shown in FIG. 5 may be associated with a vehicle wheel or other mechanism. The solenoid 67 is connected to the vehicle or other power system and a switch provides means whereby the solenoid may be energized Upon energization of the solenoid the sleeves 64 are withdrawn carrying with them the clamp rings 61 which free the weights 60. As in the previous embodiments, the rotatable mass is rotated at a speed above critical and the weights 60 allowed to assume a balancing position The solenoid 67 is then de-energized and the springs 63 force the clamping ring against weights 60 and the opposing race 59 fixing the weights in a balancing position.

If the apparatus of FIG 5 is associated with a vehicle, balancing can be obtained while the vehicle is moving as in the previous embodiments or the vehicle is stationary using some mechanism to rotate the wheels.

The embodiment shown in FIG. 6 of the drawings might be termed an automatic balancer, since it becomes operative when the mass rotates above its critical speed. When the mass is rotating above its critical speed the wedges 89 move upward or outward allowing the segmented clamping ring 81 to pivot about the connections 83 to release the weights. It should be noted that the mass of the clamping ring 81 is located below the pivotal connection 83 such that the clamping ring 81 tends to pivot outwardly under the influence of centrifugal force. As previously explained, the weight of the wedges 89 and the strength of springs 90 can be designed so that the weights 80 are released at various speeds; however, it has been found that it is desirable to design this structure so as to release the clamping ring at a rotational speed of the mass at just above critical. With the embodiment shown in FIG. 6, it should be apparent that the mass will be rebalanced every time it exceeds its critical speed. Thus, the device automatically rebalances itself continuously. In view of this fact, it may be desirable in many instances to utilize this type of balancer on a mass which normally rotates below its critical speed. When it is desired to balance the mass, it is merely necessary to rotate the mass above its critical speed in order to obtain a rebalance. As previously explained, a simple locking arrangement may be used to connect the clamping ring to the foot to prevent continuous balancing.

The embodiment shown in FIG. 7 also operates under the influence of centrifugal force. The movement of the segmented clamping channel 105 away from the spherical weights 103 and 104 allows them to seek a balancing position. The springs and channel 105 are normally designed so that this occurs when the mass is rotating above its critical speed. The latch pin can be locked in or out depending on whether selected or continuous balancing is desired.

The operation of the device shown in FIG. 8 is similar to that shown in the embodiments of FIGS. 1–3. The primary difference being in the manner whereby the power supply is energized to initiate melting of the fusible material in order to allow the weights to seek a balancing position. As previously explained, this can be accomplished by electronic devices actuated remotely, or can be accomplished by instrumentation and carried by the payload or launch vehicle. If other embodiments of the invention are applied to the payload application, their operation would be similar to that previously explained.

The utilization of the invention concept as a method for balancing rotating masses uses the apparatus of the invention to precisely locate the point where weight must be applied to balance the mass. The use of this technique is particularly desirable for rotating masses such as shafting, the armature of motors, etc., wherein a good dynamic balance initially will normally serve to provide a balance throughout the life of the mechanism. The use of such a technique, for example, on automobile tires is probably not optimum, since the tire of the automobile will wear during usage requiring rebalance during many stages of its useful life. As previously indicated, retainers containing weights and fusible matters such as utilized in FIGS. 1–3 embodiments, may be releasably attached to the rotatable mass to be balanced. Obviously, mechanism such as shown in FIGS. 5 and 6 may also be utilized to locate the particular point for adding weights to provide the proper dynamic balance. If such a mechanism were utilized, however, it should be apparent that the balancing mechanism utilized in FIGS. 5 and 6 would be divided such that the weights carried by the races would appear on either side of the geometric center of the rotatable mass.

From the above description, the many advantages of the invention should be apparent. The technique of utilizing a weight in conjunction with fusible material provides an arrangement whereby optimum balancing can be obtained. The fusible material tends to operate as a lubricant so the weight can readily assume a precise position in the retainer required for optimum balancing. The use of a pair of retainers located on opposite sides of the geometric center of the rotatable mass being balanced provides an arrangement necessary for perfect dynamic balancing. Also, the use of fusible metal with weights in a channel which has a dimension extending a substantial distance on either side of the geometric center of the mass to be balanced provides an arrangement whereby perfect balancing can be obtained. The weights can assume a position on either side of the geometric center and the fusible metal will retain the weights at the required position. The invention balancer as applied to a vehicle wheel, for example, is believed to provide a real advance in the art, since balancing can be accomplished while the vehicle is moving and at any desired time. In normal practice, the vehicle operator will possibly balance the vehicle wheels when a new set of tires is purchased and a real conscientious individual may possibly balance the wheels another time during the life of the tire. It is apparent, however, that if the wheels were rebalanced every thousand miles, the life of the tire would be greatly extended, as well as providing a much safer and more comfortable ride in the vehicle. The present balancing can be accomplished as easily as turning on the vehicle lights or windshield wiper. It is also apparent that the variation of the invention wherein the balancing occurs automatically would provide a device wherein optimum balance would be obtainable continuously. The method whereby the apparatus of the invention may be utilized to balance a rotatable mass by locating the position and amount of weight necessary to obtain balance for the mass provides a degree of accuracy which is not believed to be obtainable with present balancing equipment. Obviously, the precise point where it is necessary to add weight can be located, and the exact weight necessary to be applied readily determined or known since the weight of the above or other arrangement used to determine the point can be calibrated very accurately. Obviously, the invention apparatus is simple to construct, is easy to operate and maintain, and is foolproof in its operation requiring little or no skill to obtain a perfect dynamic balance.

While a preferred embodiment of this invention and modification have been described, it will be understood that other modifications and improvements may be made thereto.

What is claimed as new and desired to be secured by Letters Patent of the United States is:

1. A dynamic balancer for a rotatable mass or the like comprising: a mass capable of being rotated; retainer means secured to said mass and having a shape symmetrical to the mass axis of rotation; said retainer means having a channel and stops fixed to the channel; weight means movable in said retainer means in areas disposed on opposite sides of the mass center of gravity; said stops retaining said weight means on opposite sides of the center of gravity; means for fixing said weight means with respect to said retainer and rotatable mass at all rotational speeds to maintain proper balance being a segmented spring-urged, clamping member wedging between said weight means; and means for releasing said weight means being the weight of the clamping members operative under the influence of centrifugal force upon rotation of said mass to provide for rebalancing when necessary.

2. A dynamic balancer for a rotating mass or the like as in claim 1 wherein latch means is associated with said clamping channel for locking it in a wedging position.

References Cited

UNITED STATES PATENTS

| 1,209,730 | 12/1916 | Leblanc | 74—573 |
| 2,737,420 | 3/1956 | Wilborn | 301—5 |
| 3,109,321 | 11/1963 | Rogers | 301—5 |
| 3,191,997 | 6/1965 | Colvert | 301—5 |
| 3,314,726 | 4/1967 | Rehnborg | 301—5 |

FOREIGN PATENTS

| 832,048 | 4/1960 | Great Britain. |

RICHARD J. JOHNSON, *Primary Examiner.*

U.S. Cl. X.R.

73—458; 74—573